(12) United States Patent
Hildebrandt et al.

(10) Patent No.: US 9,005,040 B2
(45) Date of Patent: Apr. 14, 2015

(54) COUNTER TRACK JOINT WITH AXIAL DISPLACEMENT RANGE

(75) Inventors: Wolfgang Hildebrandt, Siegburg (DE); Orkan Eryilmaz, Lohmar (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 13/989,755

(22) PCT Filed: Nov. 26, 2010

(86) PCT No.: PCT/EP2010/068343
§ 371 (c)(1),
(2), (4) Date: Aug. 8, 2013

(87) PCT Pub. No.: WO2012/069093
PCT Pub. Date: May 31, 2012

(65) Prior Publication Data
US 2013/0316838 A1 Nov. 28, 2013

(51) Int. Cl.
*F16D 3/223* (2011.01)
*F16D 3/2237* (2011.01)
*F16D 3/2233* (2011.01)

(52) U.S. Cl.
CPC ............. *F16D 3/2237* (2013.01); *F16D 3/2233* (2013.01); *F16D 2003/22306* (2013.01); *Y10S 464/906* (2013.01)

(58) Field of Classification Search
USPC .................................. 464/140, 144–146, 906
See application file for complete search history.

(56) References Cited

U.S. PATENT DOCUMENTS

| 3,133,431 A | * | 5/1964 | Zech | ............................ 464/144 |
| 4,968,287 A | | 11/1990 | Jacob | |
| 5,221,233 A | * | 6/1993 | Jacob | ............................ 464/145 |
| 2002/0098894 A1 | | 7/2002 | Krude | |
| 2004/0072622 A1 | | 4/2004 | Hassenrik et al. | |

FOREIGN PATENT DOCUMENTS

GB 2 127 132 A 4/1984

OTHER PUBLICATIONS

PCT International Search Report & Written Opinion dated Aug. 1, 2011 for PCT/EP2010/068343.

* cited by examiner

*Primary Examiner* — Gregory Binda
(74) *Attorney, Agent, or Firm* — Bejin Bieneman PLC

(57) ABSTRACT

A joint in the form of a counter track joint is disclosed that comprises a joint outer part with first outer ball tracks and second outer ball tracks; a joint inner part with first inner ball tracks and second inner ball tracks; wherein first aperture angles are respectively formed between tangents to contact points of a ball with the first outer ball track and with the first inner ball track, and second aperture angles are respectively formed between tangents to contact points between a ball with the second outer ball track and with the second inner ball track. The first aperture angles of the first track pairs open towards a first side of the joint, and the second aperture angles of the second track pairs open towards a second side of the joint. Outer axial play is provided between the joint outer part and the ball cage. Inner axial play is provided between the ball cage and the joint inner part. Axial play permits relative axial displacement of the joint inner part with respect to the joint outer part.

8 Claims, 7 Drawing Sheets

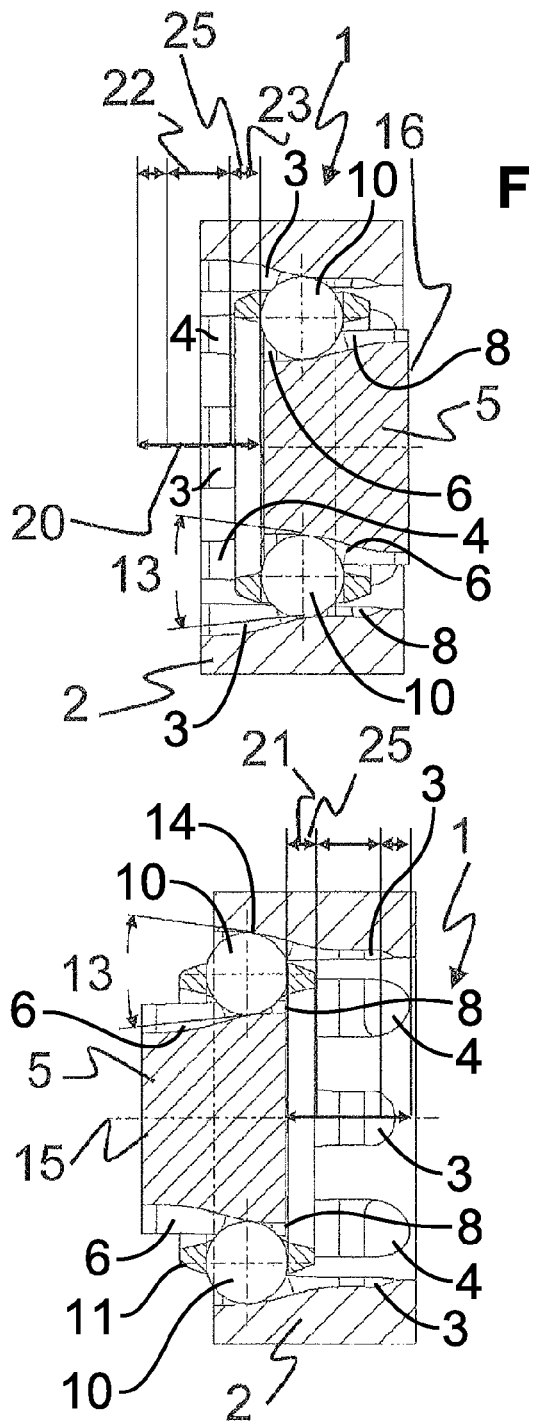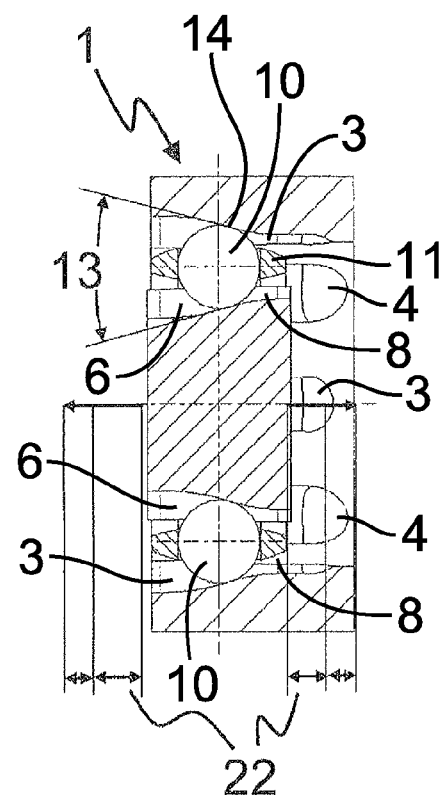
FIG. 2
FIG. 3
FIG. 4

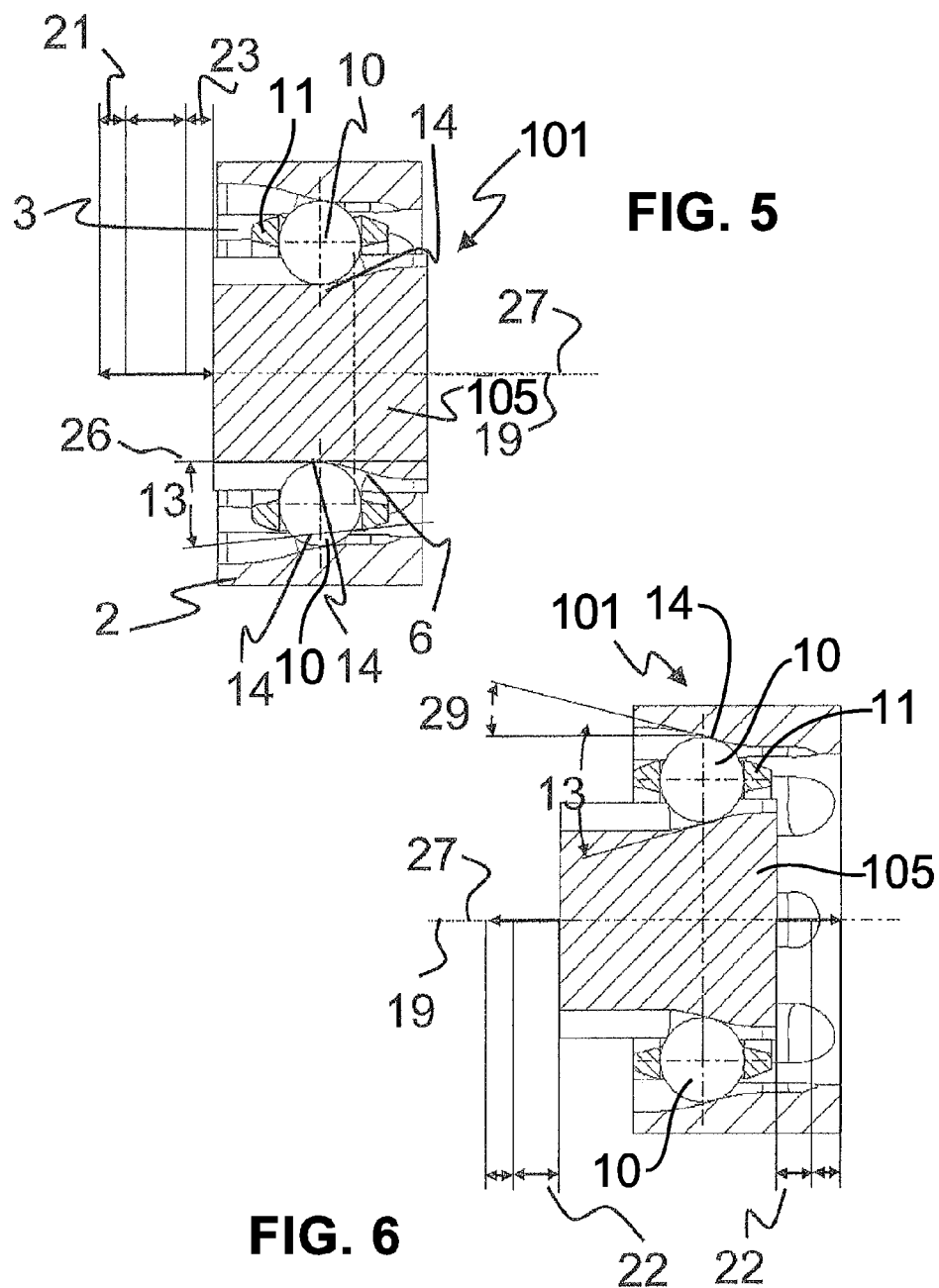

COUNTER TRACK JOINT WITH AXIAL DISPLACEMENT RANGE

CROSS REFERENCE TO RELATED APPLICATIONS

This application is a National Phase of International Application No. PCT/EP2010/068343, filed on Nov. 26, 2010, which application is hereby incorporated by reference in its entirety.

TECHNICAL FIELD

The disclosure relates to a counter track joint with an axial displacement range.

BACKGROUND

DE 100 60 120 A1 discloses a ball-type constant velocity joint in the form of a counter track joint with an axial displacement range, wherein the controlled angles of the first and second track pairs change in opposite directions along the axial displacement of the joint inner part with respect to the joint outer part. The guidance of the joint at each point on the axial displacement path varies as a result of the continuous change in the control angles of the first and second track pairs in opposite directions along the axial displacement of the joint. In addition, either a maximum or a minimum of the control angles is reached at each end point of displacement travel in the first and second track pairs.

SUMMARY

The present disclosure allows for making available a large control angle over a largest possible part of an axial displacement travel so that particularly good guidance of the joint 1 is provided in a normal working range of a joint 1, wherein reduced control properties compared to the working range can also be allowed for in the end ranges 21, 23 of the axial displacement travel. The end ranges 21, 23 of the axial displacement travel are to be configured here only with respect to the mounting capability of the joint 1.

An exemplary joint 1 is also proposed which may be configured with respect to its own axial working range 20.

More specifically, a joint 1 according to an exemplary arrangement is configured in the form of a counter track joint, in particular as a ball-type constant velocity joint. The exemplary counter track joint comprises a joint outer part 2 with first outer ball tracks 3 and second outer ball tracks 4, as well as a joint inner part 5 with first inner ball tracks 6 and second inner ball tracks 7. In this context, first outer ball tracks 3 form first track pairs 8 with first inner ball tracks 6, and second outer ball tracks 4 form second track pairs 9 with second inner ball tracks 7, wherein torque-transmitting balls 10 are guided in the first track pairs 8 and second track pairs 9. Furthermore, a ball cage 11 with cage windows 12, which are distributed around the circumference and in which the balls 10 are held, is provided. First aperture angles 13 are respectively provided between tangents to contact points of a ball 10 with the first outer ball track 3 and with the first inner ball track 6 and second aperture angles 28 are respectively provided between tangents to contact points of a ball 10 with the second outer ball track 4 and with the second inner ball track 7, wherein the first aperture angles 13 of the first track pairs 8 open towards a first side 15 of the joint 1, 101, 201, and the second aperture angles 28 of the second track pairs 9 open towards a second side 16 of the joint 1. Furthermore, on the one hand, outer axial play 17 is provided between the joint outer part 2, 102 and the ball cage 11, i.e., the joint outer part 2, 102 is radially spaced outwardly from the ball cage 11, and, on the other hand, inner axial play 18 is provided between the ball cage 11 and joint inner part 5, i.e., the joint inner part 5, 105 is radially spaced inwardly from the ball cage 11, said axial play 17, 18 permitting relative axial displacement of the joint inner part 5, 105 with respect to the joint outer part 2, 102. In this context, a range 20 of the axial displacement is divided into a first end range 21, a central working range 22 and into a second end range 23, wherein, where the joint is straight (that is to say not articulated or not deflected), the first track pairs 8 and second track pairs 9 have, in the range of the axial displacement, first aperture angles 13 and second aperture angles 28 which are opposed but always equal in absolute value, wherein in addition, the first aperture angles 13 and the second aperture angles 28 vary jointly over the entire range 20 of the axial displacement, and the first aperture angles 13 and second aperture angles 28 are largest in the central working range 22.

The ball cage 11 is supported, in particular, at least with partial ranges of its outer and/or inner circumferential surface on the joint inner part 5, 105 and/or the joint outer part 2, 102 in the radial direction and is guided through the balls 10 of the cage 11 in the axial direction. In this context, the balls 10 are self-centered as a result of the special configuration of the joint 1, 101, 201 in the form of a counter track joint. The joint 1, 101, 201 is therefore self-centering axially overall and the forces which act on the cage 11 are kept small.

The ball cage 11 is at least partially spherical in shape on its inner circumferential face and/or outer circumferential surface, with the result that radial support is made possible with respect to the joint outer part 2, 102 and/or the joint inner part 5, in particular when the joint 1, 101, 201 is articulated.

Axial stops for the ball cage 11 within the joint 1, 101, 201 for limiting the axial displacement, that is to say the axial displacement travel of the joint 1, 101, 201, are not necessarily provided.

Furthermore, the ball cage 11 can have chamfers 30 on its axial end faces on its inner circumferential surface, which chamfers 30 permit relatively large deflection of the joint inner part 5, 105 with respect to the joint outer part 2, 102 without the joint inner part 5, 105 colliding with the ball cage 11 which is deflected by half the angle of articulation.

According to one advantageous refinement of the exemplary joint 1, 101, 201, the joint outer part 2, 102 is embodied as a bell which is closed on one side. In this context, the joint outer part 2, 102 is also embodied in a single piece.

In particular transition ranges, within which a transition between the absolute values of the aperture angles 13, 28 takes place, are provided between the first end range 21 and the central working range 22, and between the second end range 23 and the central working range 22. The terms first end range 21, central working range 22, second end range 23 and transition range denote, in particular, the respective axial arrangement of the joint inner part 5, 105 with respect to the joint outer part 2, 102. If the joint 1, 101, 201 is located in the first end range 21, the joint inner part 5, 105 is displaced in the axial direction with respect to the joint outer part 2, towards a first side of the joint 1, 101, 201. If the joint 1, 101, 201 is located in the second end range 23, the joint inner part 5, 105 is displaced in the opposing axial direction with respect to the joint outer part 2, towards a second side of the joint 1.

According to one advantageous embodiment of the joint 1, 101, 201, the first track pairs 8 and second track pairs 9 are arranged alternately in the circumferential direction of the joint 1.

In one exemplary arrangement, the joint 1, 101, 201 has 2+2n balls 10, wherein n is a natural number with an absolute value greater than or equal to 1.

In a further development of the joint 1, 101, 201, the first track pairs 8 and second track pairs 9 are each arranged in pairs one next to the other. In such an embodiment of the joint 1, 101, 201, the joint 1, 101, 201 has 4+4n balls 10, wherein n is a natural number with absolute value greater than or equal to 1.

Joints with 6, 8, 10, 12 or 16 balls 10 are contemplated.

According to a further particular advantageous embodiment, the first aperture angles 13 and the second aperture angles 28 are 3 to 11 angular degrees, and in certain embodiments may be 7 to 11 angular degrees, in the central working range 22 when the joint 1, 101, 201 is straight (not articulated). Aperture angles 13, 28 are therefore provided which are embodied with such a magnitude in the actual, axially limited working range of the joint 1, 101, 201, that the joint 1, 101, 201 has good control properties. In this context, the central working range 22 is the part of the axial displacement of the joint inner part 5, 105 with respect to the joint outer part 2, 102 which is arranged between the respective first end ranges 21 and second end ranges 23 with small control angles or aperture angles 13, 28. The range 20 of the axial displacement is therefore predefined by the shapes of the first track pairs 8 and second track pairs 9, and is divided, for first track pairs 8 and second track pairs 9, into a first end range 21, a central working range 22 and a second end range 23.

According to another further advantageous embodiment, the first aperture angles 13 and second aperture angles 28 are 0 to 5 angular degrees, and may be 0 to 3 angular degrees, in the first end range 21 and in the second end range 23 when the joint 1, 101, 201 is not articulated.

The transition of the track shapes between the end ranges 21, 23 and the central working range 22 is, in particular, configured in a gradual fashion with respect to the profile of the absolute values of the aperture angles 13, 28, with the result that a sudden change in the absolute values of the aperture angles 13, 28 does not occur. In particular, the transition range is considered to be a separate range with the result that a combination of end ranges 21, 23 with aperture angles 13, 28 from 0 to 3 angular degrees with a central working range 22 with aperture angles 13, 28 from 7 to 11 angular degrees is also possible.

According to a further advantageous embodiment, the central working range 22 of the joint 1, 101, 201 is characterized by a length of at maximum 40 mm, in particular by a length of 10 to 30 mm. This provides, in particular, a joint 1, 101, 201 which has a very wide central working range 22 with good control properties.

In the range with good control properties (central working range 22), the balls 10 are arranged with respect to the fitting of the track 3, 4, 6, 7 around the balls 10 and/or track depth and with respect to the contact angles of the balls 10 with the ball tracks 3, 4, 6, 7, as in a conventional joint.

However, the small control properties in the end ranges 21, 23 make it possible to reduce the groove depth of the outer ball tracks 3, 4 and/or inner ball tracks 6, 7 and therefore the fitting of the track 3, 4, 6, 7 around the balls 10. Furthermore, the contact angles of the balls 10 with the ball tracks 3, 4, 6, 7 can be reduced. These measures are possible since the maximum power is not transmitted in the end ranges 21, 23 during operation. According to the inventive joints 1, 101, 201, the maximum transmission of force occurs only in particular when the balls 10 are located in the central working range 22.

The joint 1, 101, 201 according to the exemplary embodiment of the disclosure is configured for this special application case.

A further advantage of this method of construction is the radially compact cage 11 since the radial ball stroke is only small. As a result of the small aperture angles 13, 28 in the end ranges 21, 23, only small radial deflection of the balls 10 occurs when the latter moves along the ball tracks 3, 4, 6, 7 owing to articulation of the joint 1, 101, 201 or as a result of axial displacement of the joint outer part 2, 102 with respect to the joint inner part 5, 105. As a result of the ball tracks 3, 4, 6, 7 which are adapted structurally to reduced requirements in the end ranges 21, 23, the joint 1, 101, 201 is of a radially compact design while at the same time maintaining long overall displacement travel. This compactness simultaneously reduces the weight of the joint 1, 101, 201 considerably. A further advantage is the high degree of rigidity of the hub, that is say of the inner part 5, 105 of the joint 1, 101, 201, since the tracks 3, 4, 6, 7 which run in the longitudinal direction do not have to be embodied with such radial depth in the end ranges 21, 23 (reduced fitting of the track around the balls 10, reduced contact angles). This provides the possibility of enlarging the reception in the hub for an intermediate shaft, so that an intermediate shaft with an increased diameter can be used and increased torques can thus be transferred.

In addition, according to a further advantageous embodiment, the joint 1, 101, 201 has a first end range 21 and a second end range 23, each with an end range length 25 of at maximum 15 mm, in particular an end range length of 5 to 10 mm.

These end ranges 21, 23 are, in particular to be configured with respect to the mountability of the joint 1. It is therefore possible to provide, in the end ranges 21, 23, axial stops for the ball cage 11 which are arranged in the joint outer part 2, 102 and/or in the joint inner part 5, 105. In particular, the joint inner part 5, 105 and/or joint outer part 2, 102 can be configured in such a way that an axial mountability or demountability is made possible in the straight (not articulated) state of the joint 1. This is to be provided by means of an exemplary embodiment of the guide surfaces of the ball cage 11 on the joint outer part 2, 102 and/or on the joint inner part 5, 105 and/or by means of a particular configuration of the track shapes in at least one end range 21, 23 of the axial displacement.

According to a further particularly advantageous development of the joint 1, 101, 201, at least inner tangent angles of the first inner ball tracks 6 and second inner ball tracks 7 or outer tangent angles of the first outer ball tracks 3 and second outer ball tracks 4 are equal to zero in terms of absolute value in the first end range 21 or in the second end range 23. In this context, the inner tangent angle between a tangent to the contact point 14 of the ball 10 with the inner ball track 6, 7 and a first central axis 19 of the joint inner part 5, 105 as well as the outer tangent angle between a tangent to the contact point 14 of the ball 10 with the outer ball track 3, 4 and a second central axis 27 of the joint outer part 2, 102 is formed.

In particular, an embodiment is possible in which in the first end range 21 inner tangent angles of the first inner ball tracks 6 and second inner ball tracks 7 are equal to zero and in the second end range 23 outer tangent angles of the first outer ball tracks 3 and second outer ball tracks 4 are equal to zero; or in which in the second end range 23 inner tangent angles of the first inner ball tracks 6 and second inner ball tracks 7 are equal to zero, and in the first end range 21 outer tangent angles of the first outer ball tracks 3 and second outer ball tracks 4 are equal to zero.

These embodiments of the joint 101, 201 with "zero degrees" tangent angles in terms of absolute value are referred to below as "the second embodiment". An inner tangent angle with the absolute value of zero is therefore present given parallelism between the tangent to the contact point 14 of the ball 10 with the inner ball track 5, 6 and the first central axis 19 of the joint inner part 5, 105, and correspondingly an outer tangent angle with the absolute value zero is present given parallelism of the tangent to the contact point 14 of the ball 10 with the outer ball tracks 3, 4 and with the second central axis 27 of the joint outer part 2, 102.

As a result of this embodiment, the ball cage 11 is guided in the end ranges 21, 23 of the axial displacement only by the inner tangent angles between the inner ball track 6, 7 and the ball 10 or by the outer tangent angles between the outer ball track 3, 4 and the ball 10, which are unequal to zero. As a result, the ball cage 11 is guided only by the joint inner part 5, 105 or only by the joint outer part 2, 102, as a function of the position of the joint 101, 201 in the first end range 21 or in the second end range 23.

The proposed joint 1, 101, 201 is suitable, in particular, for the following fields of use:

As a result of the long displacement travel and simultaneously small external diameter, the joint 1, 101, 201 can be used, in particular, when there are space problems (packaging). Furthermore, the advantage of reduced weight arises. Likewise, this joint 1, 101, 201 concept described herein can be applied where long displacement travel is required for assembly or disassembly and at the same time comparatively small dynamic displacements are expected during the use/travel. This can be used in particular in rear wheel applications in the field of passenger cars (displacement joint on both sides for connecting the wheels).

If other demands are made regarding the packaging, that is to say of the overall size of the joint 1, 101, 201, the second embodiment is advantageous since here no radial deflection of the balls 10 in the joint outer part 2, 102 takes place in the respective end range 21, 23 owing to the "zero absolute values" of the outer tangent angles, and the outer ball tracks 3, 4 in the respective end range 21, 23 do not run further in the radial direction but rather only in the axial direction. Furthermore, according to the second embodiment, a relatively large overall displacement travel can be made available by a joint 101, 201 given a predefined overall size. This is in particular not limited in one end range 21, 23 in each case and can be used as a "crash-in" feature in longitudinal shafts. This means that the joint inner part 5, 105 can be pushed into the joint outer part 2, 102 so that, in particular the joint 101, 201 is not destroyed in the event of a crash.

In order to reduce the size of the joint 1, 101, 201 further in the axial and radial direction, there is the option of fastening the balls 10 either in the joint outer part 2, 102 or in the joint inner part 5, so that there can be a transition from (pure) rolling friction to mixed friction and/or sliding friction. This can be implemented, for example, by an axial end stop in the outer or inner ball tracks 3, 4, 6, 7 in the respective end range 21, 23, so that the balls 10 can no longer be moved further in the axial direction with respect to the joint outer part 2, 102 or the joint inner part 5, 105.

It is necessary, in particular, to take into account the fact that the so-called NVH (noise-vibration-harshness) properties in the end ranges 21, 23 of the joint 1 are worse in the case of a joint 101, 201 according to the second embodiment than in the case of other embodiments of the joint 1 according to the disclosure.

It is to be noted that the features which are specified individually in the dependently formulated patent claims can be combined with one another in any desired technically appropriate way and define further refinements of the disclosure. Furthermore, the features which are specified in the patent claims are described and explained in more detail in the description, with further exemplary embodiments of the disclosure being presented.

BRIEF DESCRIPTION OF THE DRAWINGS

The disclosure and the technical surroundings are explained in more detail below with reference to the figures. It is to be noted that the figures show particularly exemplary embodiment variants of the disclosure, but are not restricted thereto. In the schematic drawings:

FIG. 2 shows a side view of the joint, positioned in a second end range:

FIG. 3 shows the joint according to FIG. 2, positioned in a central working range:

FIG. 4 shows the joint according to FIG. 2 and FIG. 3 positioned in a first end range;

FIG. 5 shows a side view of the joint, positioned in a second end range according to the second embodiment;

FIG. 6 shows the joint according to FIG. 5, positioned in a central working range.

DETAILED DESCRIPTION

Figure 1:
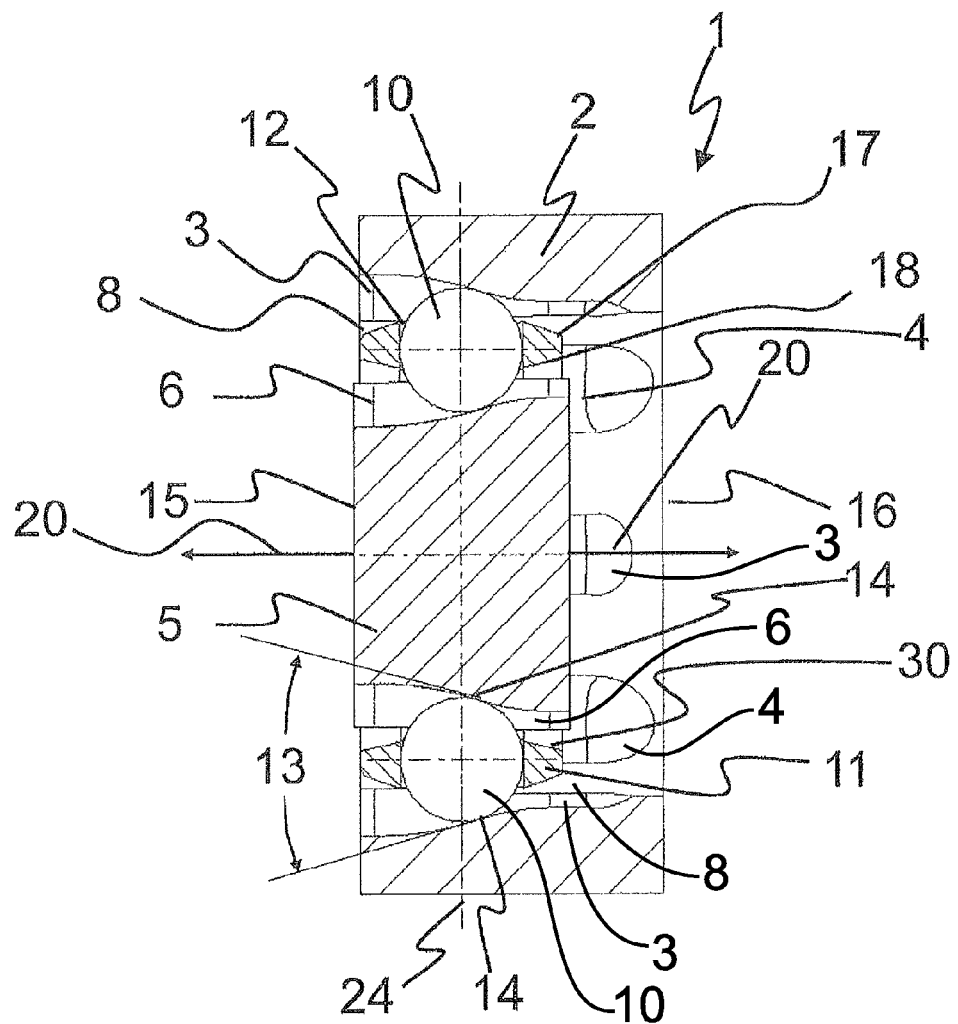
FIG. 1 shows a side view of a joint according to the disclosure.
Figure 8:
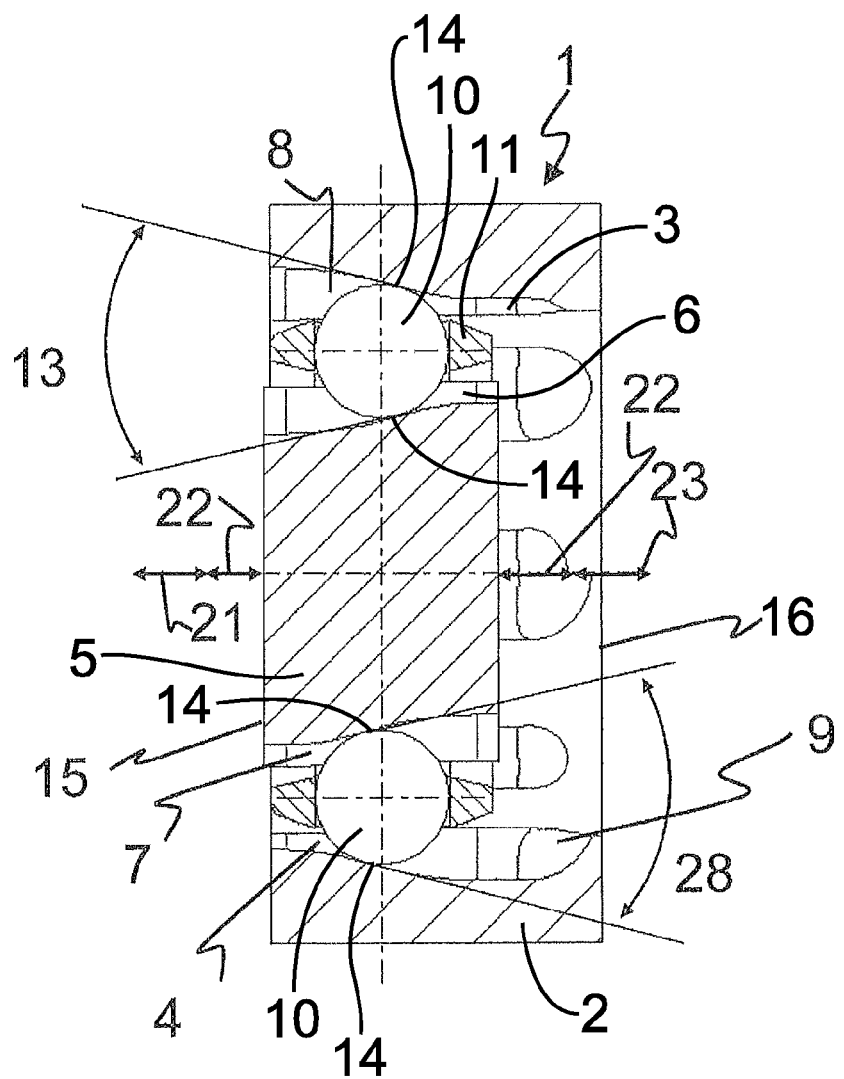
FIG. 8 shows a further side view of a joint according to the disclosure with a first track pair and a second track pair in section.
Figures 9, 10:
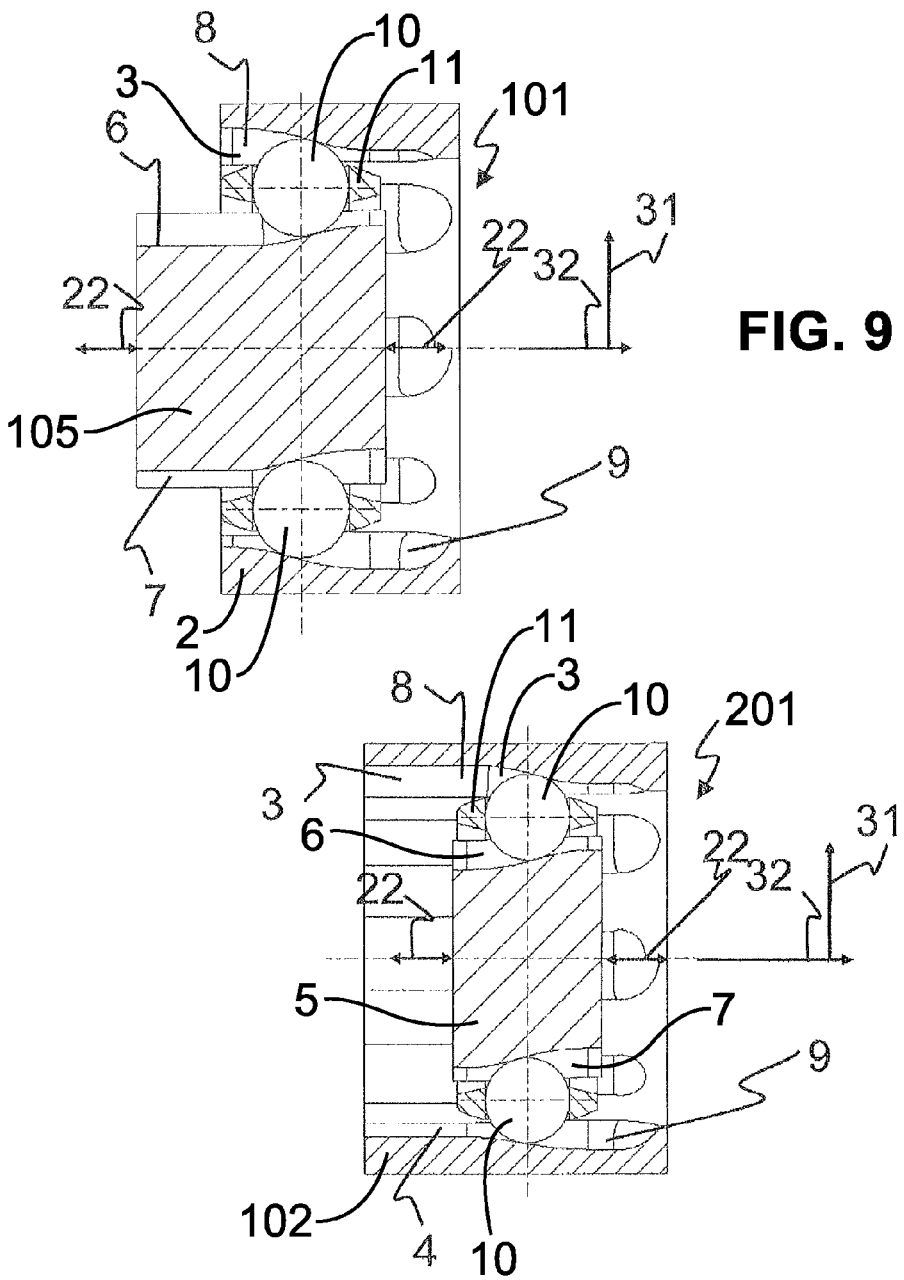
FIG. 9 shows a further side view of an inventive joint according to the second embodiment.
FIG. 10 shows a further side view of a further inventive joint according to the second embodiment.

FIG. 1 shows a lateral section through a joint 1 with a first side 15 and a second side 16 as well as with a joint outer part 2 and joint inner part 5 with first track pairs 8 arranged opposite one another and second track pairs 9 arranged opposite one another (shown in FIGS. 8-10). This particular arrangement of the track pairs 8, 9 is a feature of joint 1 with four, eight or twelve balls 10. In the present illustration, eight balls 10 are shown. In this context, first outer ball tracks 3 and first inner ball tracks 6 form first track pairs 8 and second outer ball tracks 4 and second inner ball tracks 7 form second track pairs 9. The track pairs 8, 9 are arranged opposite one another and otherwise of symmetrical design. In the first track pairs 8 and second track pairs 9 balls 10 are arranged which are held in a plane 24 by the ball cage 11, which has cage windows 12. Furthermore, first aperture angles 13 are provided which are formed by tangents to the contact points 14 between balls 10 and the first inner ball track 6 and first outer ball track 3. The joint 1 is configured in such a way that the joint inner part 5 can be displaced with respect to the joint outer part 2 in a range 20 of axial displacement. This is due to an outer axial play 17 between the ball cage 11 and the joint outer part 2. i.e., space between the ball cage 11 and the joint outer part 2 as identified with reference numeral 17, and an inner axial play 18 between the ball cage 1 and the joint inner part 5, i.e., space between the ball cage 11 and the joint inner part 5 as identified with reference numeral 18. Furthermore, the ball cage 11 has, on its internal circumferential surface, a chamfer 30, with the result that when the joint 1 is articulated there is no collision of the ball cage 11 with the joint inner part 5.

FIG. 2 is a schematic view of the joint 1 in a second end range 23 of the range 20 of the axial displacement. The joint inner part 5 is displaced here with respect to the joint outer part in the direction of the second side 16 of the joint 1. In this context, first aperture angles 13 are present which, compared to the first aperture angles 13 in the central working range 22 of the joint 1, have a smaller angular absolute value. The second end range 23 has an end range length 25.

FIG. 3 is a schematic view of a further lateral section of the joint 1 according to FIG. 2 in a central working range 22, wherein first aperture angles 13 are formed which permit good control properties of the joint 1 over the entire central working range 22 of the axial displacement.

FIG. 4 shows, in a way which corresponds to FIG. 2 and FIG. 3, the joint 1 in a first end range 21, wherein the joint inner part 5 is displaced with respect to the joint outer part 2 in the direction of the first side 15 of the joint 1. Smaller first aperture angles 13 with small control properties are present in this first end range 21 compared to the central working range 22. The first end range 21 has an end range length 25.

FIG. 5 is a schematic view of a lateral section through a joint 101 according to the second embodiment, in which joint small first aperture angles 13 are present in a first end range 21 and a second end range 23. The joint 101 is located in a second end range 23. Here, the inner tangent angle 26 to contact points 14 between the ball 10 and inner ball track 6 of the joint inner part 105 is zero degrees (0)°. In this context, the inner tangent angle 26 is formed between, on the one hand, the tangent to the contact point 14 of the ball 10 with the first inner ball track 6 (or the second inner ball track 7) of the joint inner part 105, and, on the other hand, the first central axis 19 of the joint inner part 105, and the outer tangent angle 29 (not illustrated here) is defined between the contact point 14 of the ball 10 to the first outer ball track 3 (or the second outer ball track 4) of the joint outer part 2, on the one hand, and the second central axis 27 of the joint outer part 2, on the other hand.

FIG. 6 shows a joint 101 according to FIG. 5 which is arranged in a central working range 22 of the axial displacement, wherein outer tangent angles 29 and corresponding first aperture angles 13 are formed which permit good control properties of the joint 101 over the entire central working range 22 of the axial displacement.

Figure 7:
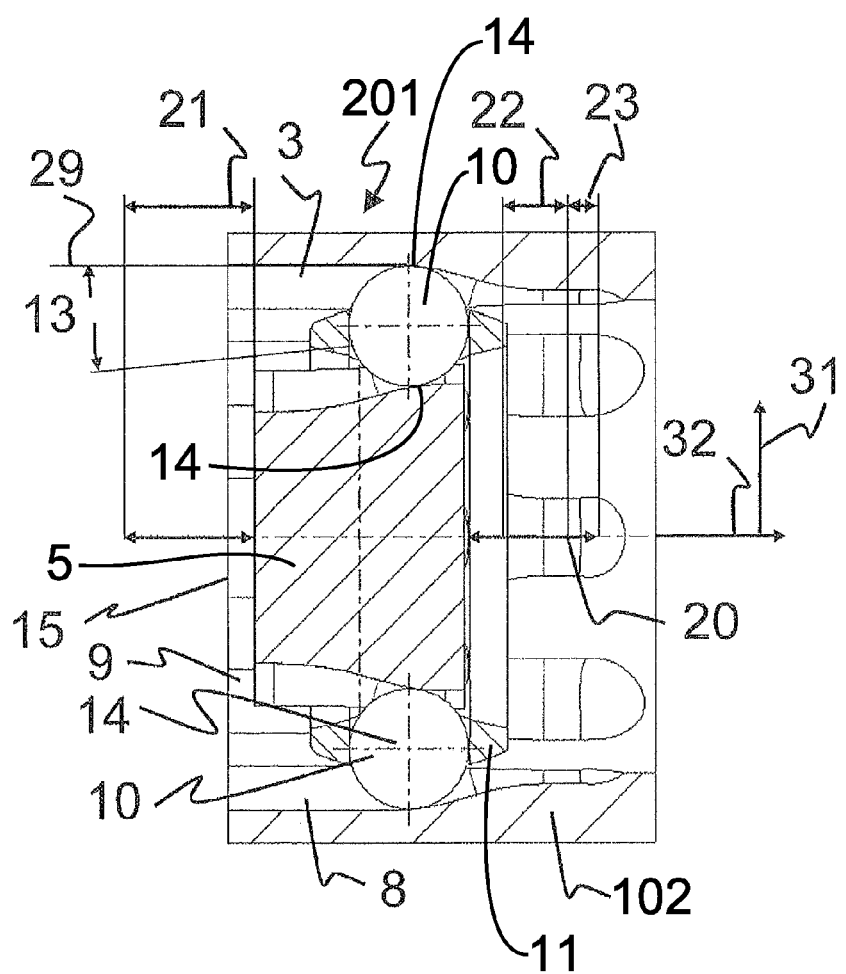
FIG. 7 shows a joint according to the second embodiment, positioned in a first end range.

FIG. 7 shows a joint 201 according to the second embodiment which is positioned in a first end range 21 of the range 20 of the axial displacement. Here, the absolute values of the outer tangent angles 29 to the contact points 14 between the ball 10 and the first outer ball track 3 (and the second outer ball track 4) of the joint outer part 102 are equal to zero, and the first aperture angles 13 have only small angular values. The joint 201 has first track pairs 8 and second track pairs 9 which pass through the first side 15, wherein the track pairs 8, 9 in the first end range 21 have outer ball tracks 3, 4 with outer tangent angles 29 whose absolute value is zero, with the result that a profile of the outer ball tracks 3, 4 can be of any length, thereby not extending in the radial direction 31 but exclusively in the axial direction 32.

FIG. 8 shows a further side view of a joint 1 according to the disclosure with a first track pair 8 and second track pair 9 in section. The second track pair 9 comprises second outer ball track 4 and second inner ball track 7. The joint 1 is located in the central working range 22, wherein here the first aperture angles 13 and second aperture angles 28 are equal in absolute value but oriented in opposite directions to one another.

FIG. 9 shows a further side view of a joint 101 according to an exemplary embodiment of the disclosure, wherein a first track pair 8 and second track pair 9 are also illustrated in section here. The joint 101 is located in the central working range 22. In the second end range 23, in which the joint 101 would be arranged if the joint inner part 105 were to be displaced to the right from the illustrated position with respect to the joint outer part 2, inner tangent angles 26 of the first inner ball track 6 and of the second inner ball track 7 are zero in terms of absolute value (not illustrated). The inner ball tracks 6, 7 have a non-limited profile in the axial direction 32 without a ball stroke occurring in the radial direction 31.

FIG. 10 shows a side view of a further joint 201 according to another exemplary embodiment of the disclosure, wherein a first track pair 8 and a second track pair 9 are also illustrated in section here. The joint 201 is located in the central working range 22. In the first end range 21, in which the joint 201 would be arranged if the joint inner part 5 were to be displaced to the left from the illustrated position with respect to the joint outer part 102, outer tangent angles 29 of the first outer ball track 3 and of the second outer ball track 4 are zero in terms of absolute value (not illustrated). The outer ball tracks 3, 4 have a non-limited profile in the axial direction 32 without a ball stroke occurring in the radial direction 31.

The exemplary embodiments, which are illustrated in FIG. 9 and FIG. 10 are suitable, in particular, for applications in longitudinal shafts, with the result that the latter can be displaced one into the other in the event of a crash therefore preventing uncontrollable deformation of the longitudinal shaft. In conventional joints, such deformation is not possible with the result that penetration of the longitudinal shaft into the passenger compartment of a passenger car could not be prevented.

The present application is not restricted to the illustrated exemplary embodiments. Instead, numerous further refinements of the invention are possible. For example, instead of the illustrated S-shaped first inner ball tracks 6, second inner ball tracks 7, first outer ball tracks 3 and second outer ball tracks 4 it is also possible to use other track shapes, in particular even non-continuous, segmented track shapes. These have non-continuous transitions, in particular in the transition range from the first end range 21 and second end range 23 to the central working range 22, wherein the central working range 22 has continuously running track shapes in the joint inner part 5 and joint outer part 2. Furthermore, the first end ranges 21 and second end ranges 23 can be configured differently from one another.

Figure 11:
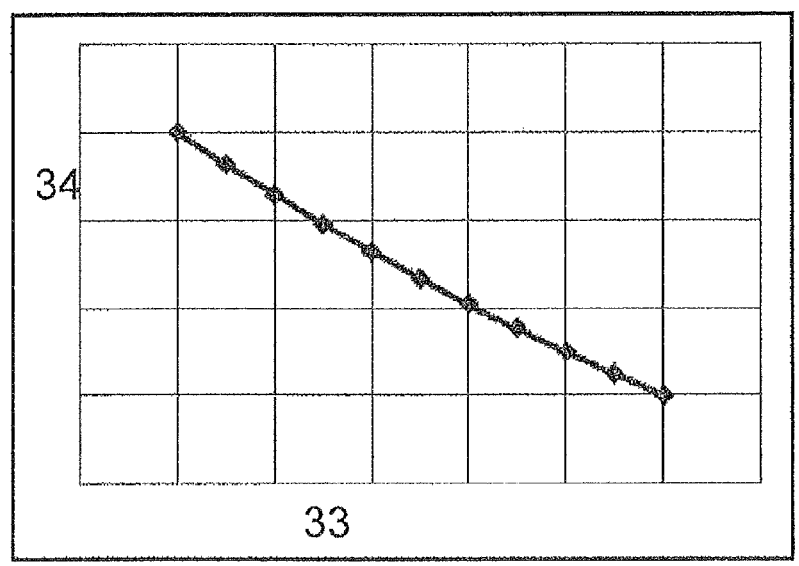
FIG. 11 shows an illustration of the profile of the screw lateral force plotted against the PCR-hole-pattern.

A further advantage of the joint is that it is well suited for use with an embodiment of the joint outer part as a flange. In this design, the joint is connected to a differential by screw connections through the joint outer part. As a result of the design of the joint which is compact, in particular, in the radial direction, the screw connections are arranged at a short distance from the center of the joint, with the result that a relatively large lateral force acts on the screws. Either six large screw diameters or preferably eight (or more) relatively small screw diameters can then be used since the exclusively axial and radial profile of the tracks makes available more installation space between the tracks than in the case of joints with ball tracks which have a profile in the axial direction and in the circumferential direction of the joint. In the case of large ball track lengths which are necessary for displacement joints, the conventionally used so-called VL joint (with ball tracks which run in the circumferential direction) can then be replaced by the joints according to the disclosure. Joints which are of compact design can then be used for the first time since in the case of long displacement travel the previously used VL joints have to be constructed with relatively large external diameters in order to provide sufficient installation space for screw connections between the intersecting ball tracks. The joints according to the disclosure can therefore take up a relatively large lateral force 34 acting on the screws (shear force, unit [N]) since in the case of the same PCR (pitch circle radius) more installation space is available between the ball tracks and a corresponding stability of the joint outer part is ensured. FIG. 11 illustrates a corresponding profile of the lateral force 34 acting on the screws occurring at the joint, plotted against the PCR-hole-pattern 33 (unit [mm]). The PCR-hole-pattern denotes the arrangement of the screws (radius starting from the second central axis 27 of the joint outer part) with respect to the connection of the flange of the joint outer part, for example to a differential.

What is claimed is:

1. A joint in the form of a counter track joint, comprising:
    a joint outer part with first outer ball tracks and second outer ball tracks;
    a joint inner part with first inner ball tracks and second inner ball tracks;
    wherein first outer ball tracks form first track pairs with first inner ball tracks, and wherein second outer ball tracks form second track pairs with second inner ball tracks;
    torque-transmitting balls which are guided in the first track pairs and second track pairs;
    and a ball cage with cage windows distributed around the circumference;
    wherein first aperture angles are respectively formed between tangents to contact points of a ball with the first outer ball track and with the first inner ball track, and second aperture angles are respectively formed between tangents to contact points between a ball with the second outer ball track and with the second inner ball track,
    wherein the first aperture angles of the first track pairs open towards a first side of the joint, and the second aperture angles of the second track pairs open towards a second side of the joint,
    wherein joint outer part is radially spaced outwardly from the ball cage and the joint inner part is radially space inwardly from the ball cage permitting relative axial displacement of the joint inner part with respect to the joint outer part,
    wherein a range of the axial displacement is divided into a first end range, a central working range and a second end range, wherein, when the joint is straight, the first track pairs and second track pairs have, in the range of the axial displacement, first aperture angles and second aperture angles which are opposed but always equal in absolute value,
    wherein the first aperture angles and second aperture angles vary jointly over the entire range of the axial displacement, and the first aperture angles and second aperture angles are largest in the central working range.

2. The joint according to claim 1, wherein the first track pairs and second track pairs are alternately arranged in a circumferential direction of the joint.

3. The joint as claimed in claim 1, wherein the joint has 2+2n balls, wherein n is a natural number.

4. The joint according to claim 1, wherein the first aperture angles and the second aperture angles are 3 to 11 angular degrees in the central working range when the joint is not articulated.

5. The joint according to claim 1, wherein the first aperture angles and second aperture angles are 0 to 5 angular degrees in a first end range and/or in a second end range when the joint is not articulated.

6. The joint according to claim 5, wherein a central working range has a length of a maximum 40 mm.

7. The joint according to claim 5, wherein the first end range and/or the second end range each has an end range length of a maximum 15 mm.

8. The joint according to claim 5, wherein at least inner tangent angles of the first inner ball tracks and second inner ball tracks or outer tangent angles of the first outer ball tracks and second outer ball tracks are equal to zero in the first end range or in the second end range, wherein the inner tangent angle between a tangent to the contact point of the ball with the inner ball track and a first central axis of the joint inner part as well as the outer tangent angle between a tangent to the contact point of the ball with the outer ball track and a second central axis of the joint outer part are formed.

\* \* \* \* \*